US011992992B2

(12) United States Patent
Yoshino et al.

(10) Patent No.: US 11,992,992 B2
(45) Date of Patent: *May 28, 2024

(54) LIQUID BLOW MOLDING DEVICE

(71) Applicant: YOSHINO KOGYOSHO CO., LTD., Tokyo (JP)

(72) Inventors: Kei Yoshino, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 17/614,405

(22) PCT Filed: Apr. 7, 2020

(86) PCT No.: PCT/JP2020/015708
§ 371 (c)(1),
(2) Date: Nov. 26, 2021

(87) PCT Pub. No.: WO2020/241063
PCT Pub. Date: Dec. 3, 2020

(65) Prior Publication Data
US 2022/0203596 A1    Jun. 30, 2022

(30) Foreign Application Priority Data

May 30, 2019    (JP) .................................. 2019-101668

(51) Int. Cl.
*B29C 49/46*    (2006.01)
*B29C 49/00*    (2006.01)
(Continued)

(52) U.S. Cl.
CPC ............ *B29C 49/46* (2013.01); *B29C 49/006* (2022.05); *B29C 49/12* (2013.01); *B29C 49/58* (2013.01);
(Continued)

(58) Field of Classification Search
CPC ............ B29C 49/46; B29C 2049/4664; B29C 49/4273
See application file for complete search history.

(56) References Cited

U.S. PATENT DOCUMENTS 10,137,606 B2    11/2018    Chauvin et al.
11,407,163 B2 *    8/2022    Shiokawa ........... B29C 49/4273
(Continued)

FOREIGN PATENT DOCUMENTS

CN    105121129 A    12/2015
CN    107614240 A    1/2018
(Continued)

OTHER PUBLICATIONS

Mechanical translation of Lappe et al (DE 102015208956 A1) dated Nov. 2016. (Year: 2016).*
(Continued)

*Primary Examiner* — Robert B Davis
(74) *Attorney, Agent, or Firm* — Oliff PLC

(57) ABSTRACT

A liquid blow molding apparatus, including: a nozzle configured to define a flow path for a liquid that includes an opening and closing port and a discharge port; a seal body configured to open and close the opening and closing port and includes a guide hole; and a rod configured to move in an axial direction while being guided by the guide hole, wherein the seal body includes a tubular-shaped extension portion configured to extend into the discharge port when the seal body closes the opening and closing port, and a tip surface of the extension portion is configured to have liquid repellency.

4 Claims, 4 Drawing Sheets

(51) Int. Cl.
  *B29C 49/12* (2006.01)
  *B29C 49/42* (2006.01)
  *B29C 49/58* (2006.01)
  *B29L 31/00* (2006.01)

(52) U.S. Cl.
  CPC . *B29C 2049/4664* (2013.01); *B29L 2031/712* (2013.01)

(56) References Cited

U.S. PATENT DOCUMENTS

| | | |
|---|---|---|
| 2016/0200029 A1 | 7/2016 | Shiokawa et al. |
| 2016/0250798 A1 | 9/2016 | Diesnis |
| 2016/0271858 A1* | 9/2016 | Diesnis ............... B29C 49/06 |
| 2018/0043606 A1 | 2/2018 | Morikami et al. |

FOREIGN PATENT DOCUMENTS

| | | |
|---|---|---|
| DE | 102015208956 A1 * | 11/2016 |
| JP | S55-39323 A | 3/1980 |
| JP | 2007-273287 A | 10/2007 |
| JP | 2013-208834 A | 10/2013 |
| JP | 2016-168801 A | 9/2016 |
| WO | 2018/144055 A1 | 8/2018 |
| WO | 2019/026535 A1 | 2/2019 |
| WO | 2019/058813 A1 | 3/2019 |

OTHER PUBLICATIONS

Feb. 3, 2023 Office Action issued in Chinese Patent Application No. 202080039214.3.

Apr. 20, 2023 extended Search Report issued in European Patent Application No. 20815392.4.

Jun. 16, 2020 International Search Report issued in International Patent Application No. PCT/JP2020/015708.

Aug. 22, 2023 Office Action issued in Chinese Application No. 202080039214.3.

\* cited by examiner

LIQUID BLOW MOLDING DEVICE

TECHNICAL FIELD

This application relates to a liquid blow molding apparatus.

BACKGROUND

Synthetic resin containers, typical examples of which include polypropylene (PP) bottles and polyethylene terephthalate (PET) bottles, have been used to contain a variety of content liquids, such as beverages, cosmetics, pharmaceuticals, detergents, or toiletries including shampoo. Such a container is typically formed as follows. That is, a resin preform which has been formed in a bottomed tubular shape by injection molding or the like is heated to a temperature at which a stretching effect may be achieved. Then, a pressurized fluid is supplied into the preform in the heated state using a blow molding apparatus, so that the preform is blow molded into a predetermined shape.

Liquid blow molding apparatuses that use a pressurized liquid, instead of pressurized air, as a pressurizing fluid to be supplied into a preform are known. In this case, a content liquid which is to be ultimately filled into a container as a product may be used as the pressurizing liquid. By doing so, the step of filling the content liquid into the container may be omitted, and the production process and the configuration of the liquid blow molding apparatus may be simplified.

For example, Patent Literature (PTL) 1 describes a liquid blow molding apparatus including a nozzle configured to define a flow path for a liquid that includes an opening and a closing port, a seal body configured to open and close the opening and the closing port and includes a guide hole, and a rod configured to move in the axial direction while being guided by the guide hole. In the disclosed liquid blow molding apparatus, by operating the seal body so as to open the opening and the closing port and supplying a pressurized liquid into the flow path, while a tip of the nozzle is engaged with the mouth of a preform placed in a mold, the pressurized liquid is supplied into the preform through the nozzle to thereby stretch the preform. Thus, the preform is molded into a container having a shape corresponding to the cavity of the mold.

CITATION LIST

Patent Literature

PTL 1: JP 2013-208834 A

SUMMARY

Technical Problem

In a known liquid blow molding apparatus as described in PTL 1, after blow molding and when the nozzle is raised and separated from the mouth of a container, a liquid can drip down from the surface of the nozzle or the surface of the rod to which it has adhered. In particular, in a case in which a relatively highly viscous liquid, such as shampoo or liquid detergent, is used as a liquid for blow molding, it takes long for the dripping down of the liquid to start from the nozzle or the like after blow molding, and moreover, the liquid continues to run in a thin stream for a while. Accordingly, the liquid is likely to drip down onto the molded container or the mold from which the molded container has been removed, and the liquid can be left adhered to them.

It would be helpful to provide a liquid blow molding apparatus capable of preventing the dripping down of a liquid from the nozzle after blow molding.

Solution to Problem

One aspect of the present disclosure resides in a liquid blow molding apparatus including: a nozzle configured to define a flow path for a liquid that includes an opening and closing port and a discharge port; a seal body configured to open and close the opening and closing port and includes a guide hole; and a rod configured to move in an axial direction while being guided by the guide hole, wherein the seal body includes a tubular-shaped extension portion configured to extend into the discharge port when the seal body closes the opening and closing port, and a tip surface of the extension portion is configured to have liquid repellency.

In a preferred embodiment of the liquid blow molding apparatus configured as above, a tip surface and an outer peripheral surface of the rod are configured to have liquid repellency.

In another preferred embodiment of the liquid blow molding apparatus configured as above, at least one of an outer peripheral surface of the extension portion of the seal body and an inner surface defining the discharge port of the nozzle is configured to have liquid repellency.

In still another preferred embodiment of the liquid blow molding apparatus configured as above, the liquid blow molding apparatus further includes a liquid drawing unit configured to draw the liquid, wherein the extension portion of the seal body includes a drawing hole configured to communicate with the tip surface of the extension portion, and the nozzle includes a drawing path configured to connect the drawing hole and the liquid drawing unit when the seal body closes the opening and closing port.

Advantageous Effect

According to the present disclosure, a liquid blow molding apparatus capable of preventing the dripping down of a liquid from the nozzle after blow molding can be provided.

DETAILED DESCRIPTION

Hereinafter, an embodiment of the present disclosure will be described by illustration in more detail with reference to the drawings.

Figure 1:
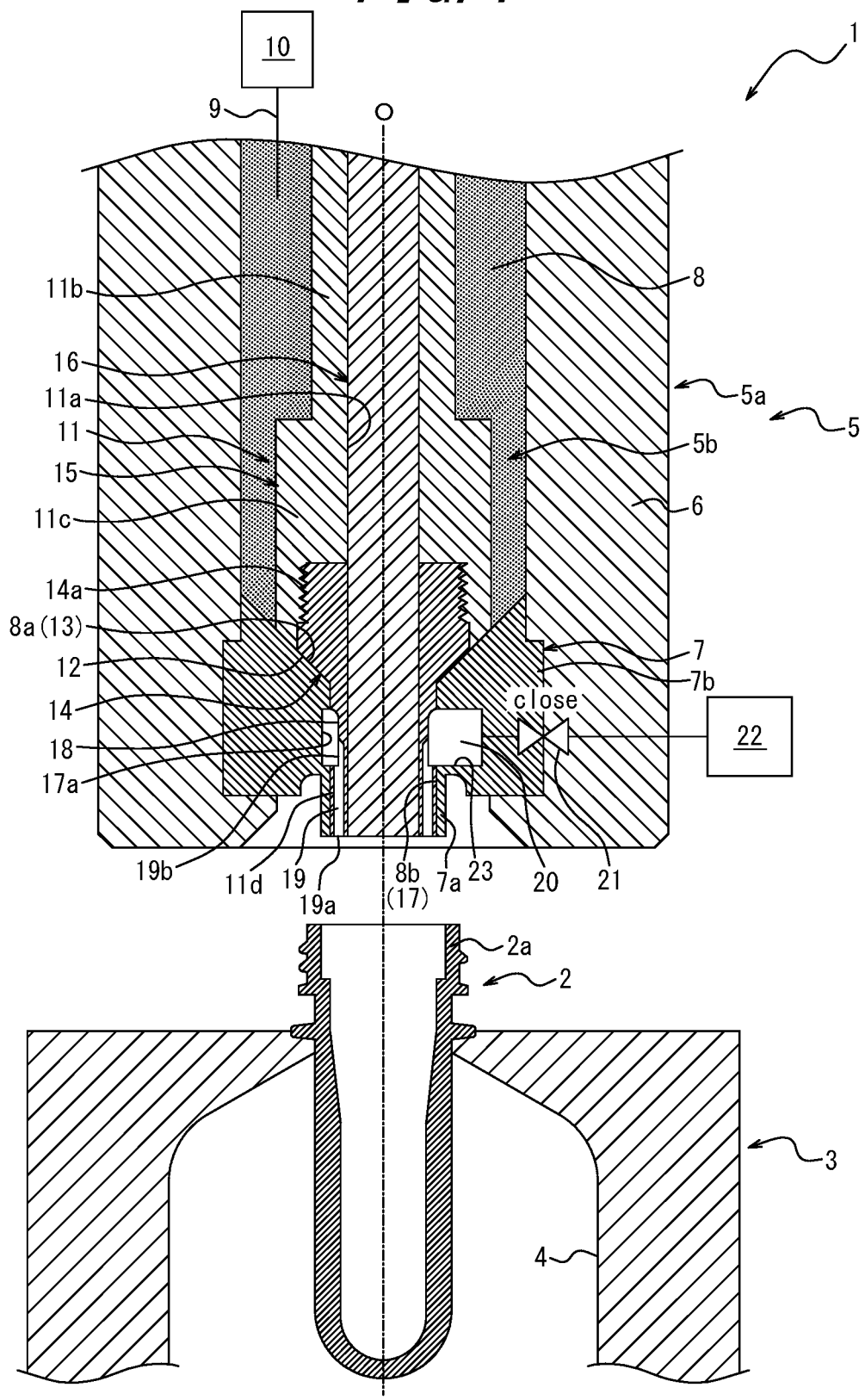
FIG. 1 is a longitudinal sectional view illustrating a liquid blow molding apparatus in a standby state according to an embodiment of the present disclosure.
Figure 2:
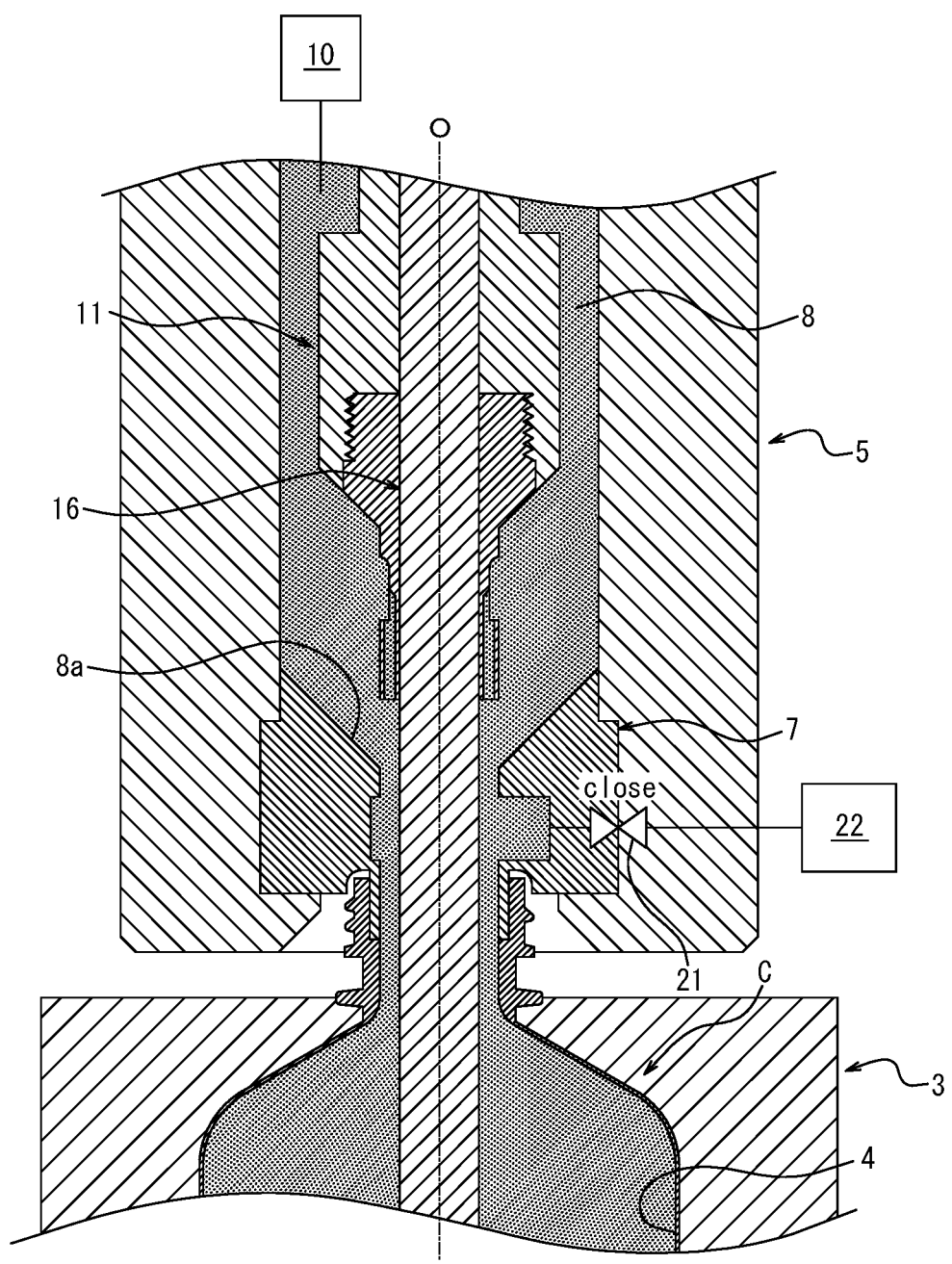
FIG. 2 is a longitudinal sectional view illustrating the liquid blow molding apparatus of FIG. 1 in a state in which blow molding is being performed.

As illustrated in FIG. 1, a liquid blow molding apparatus 1 according to the present embodiment is an apparatus that blow molds a bottomed tubular-shaped preform 2 having a mouth 2a into a container C (refer to FIG. 2). The liquid blow molding apparatus 1 includes a mold 3 into which the preform 2 can be placed. Although illustrated only partially in the figure, a cavity 4 of the mold 3 has a bottle shape and is open at an upper surface of the mold 3. The preform 2 is placed into the mold 3 in an upright position, with its mouth 2a arranged on the upper side. When the preform 2 is placed into the mold 3, the mouth 2a protrudes above the cavity 4. Although not illustrated in detail, the mold 3 can be opened into left and right mold halves, and, by opening the mold 3, the molded container C can be removed from the mold 3.

In the present embodiment, an up and down direction means a vertical direction. Further, in this embodiment, the cavity 4 of the mold 3, the nozzle end member 7, the seal body 11, and the rod 16 have a common central axis O extending in the up and down direction. In the present embodiment, a longitudinal section means a section including the central axis O, and a transverse section means a section perpendicular to the central axis O. Additionally, it is not essential that the central axis O extend along the up and down direction, and the central axis O may extend, for example, in the up and down direction while being inclined with respect to the up and down direction.

As the preform 2, for example, it is possible to use a preform that has been obtained by forming a thermoplastic resin material, which exhibits stretchability when being heated, into a bottomed tubular shape by injection molding, compression molding, extrusion molding, or the like. The thermoplastic resin material may be polypropylene (PP), polyethylene terephthalate (PET), polyethylene (PE), or the like.

Above the mold 3, a nozzle unit 5 is provided in a manner such that it is movable in the up and down direction relative to the mold 3. The nozzle unit 5 includes a nozzle body 6. The nozzle body 6 is configured by combining a plurality of members, although an illustration and description of the detail will be omitted.

The nozzle unit 5 is provided with a tubular-shaped nozzle end member 7, which can engage with the mouth 2a of the preform 2. The nozzle end member 7 has a nozzle tip 7a formed in a cylindrical shape having an outer diameter smaller than an inner diameter of the mouth 2a of the preform 2. The nozzle tip 7a has a lower end surface that abuts against a stepped portion formed on an inner surface of the mouth 2a of the preform 2. Additionally, the nozzle tip 7a may have an outer diameter equal to the inner diameter of the mouth 2a of the preform 2, so that an outer peripheral surface of the nozzle tip 7a abuts against an inner peripheral surface of the mouth 2a. The nozzle end member 7 may be engaged with the mouth 2a, by the nozzle tip 7a being inserted into the mouth 2a of the preform 2. Further, the nozzle end member 7 is provided, on an outer peripheral surface thereof, with a holding portion 7b, at which the nozzle end portion 7 is held by and fixed to an inner surface of the nozzle body 6. Additionally, the nozzle end member 7 may be formed of, for example, a steel material or a resin material.

The nozzle end member 7 is disposed coaxially with the cavity 4 of the mold 3. Accordingly, when the nozzle unit 5 is lowered to a predetermined position, the nozzle tip 7a can be inserted into the mouth 2a of the preform 2 placed into the mold 3.

In the nozzle body 6 and the nozzle end member 7, there is provided a flow path 8 for a liquid that extends along the central axis O. The flow path 8 includes an opening and closing port 8a, which can be opened and closed by the seal body 11, and a discharge port 8b, which is contiguous with a lower end of the opening and closing port 8a. The opening and closing port 8a is defined by an inverted conical-shaped upper surface of the nozzle end member 7, and the discharge port 8b is defined by a cylindrical-shaped inner peripheral surface of the nozzle end member 7. A pressurized liquid supply unit 10 is connected to a portion of the flow path 8 that is located upstream of the opening and closing port 8a via a pipe 9. During blow molding, the pressurized liquid supply unit 10 can supply a liquid that has been pressurized to a predetermined pressure into the preform 2, through the pipe 9, the opening and closing port 8a, and the discharge port 8b.

As the pressurized liquid supply unit 10, for example, it is preferable to use a configuration in which a plunger pump is used as a pressure source. It is, however, possible to use another configuration, by which a pressurized liquid that has been pressurized to a predetermined pressure can be supplied into the flow path 8.

As a liquid that is to be supplied into the flow path 8 and thus into the preform 2 by the pressurized liquid supply unit 10, for example, a relatively highly viscous liquid, such as shampoo or liquid detergent, may be used. The present embodiment is optimal in a case in which a high viscosity liquid having a viscosity of not less than 10000 mPa·s during its supply into the preform 2 when the problem of the dripping down of the liquid from the nozzle unit 5 becomes remarkable, or a medium viscosity liquid having a viscosity of not less than 1000 mPa·s and less than 10000 mPa·s during its supply into the preform 2 is used. The present embodiment, however, is also applicable in a case in which a low viscosity liquid having a viscosity of less than 1000 mPa·s during its supply into the preform 2 is used.

In the flow path 8, a tubular-shaped seal body 11 is disposed to extend along the central axis O. The seal body 11 opens and closes the opening and closing port 8a, and includes a guide hole 11a. The seal body 11 is movable in the up and down direction between a closed position, in which the seal body 11 abuts against the nozzle end member 7 from above to thereby close the opening and closing port 8a, and an open position, in which the seal body 11 is away from the nozzle end member 7 to thereby open the opening and closing port 8a. Further, the seal body 11 integrally includes a cylindrical-shaped shaft body 11b, a cylindrical-shaped large-diameter portion 11c connecting to a lower end of the shaft body 11b and having an outer diameter larger than the shaft body 11b, and a cylindrical-shaped extension portion 11d connecting to a lower end of the large-diameter portion 11c and having an outer diameter smaller than the large-diameter portion 11c. The extension portion 11d is configured to extend into the discharge port 8b when the seal body 11 closes the opening and closing port 8a. By moving the seal body 11 to the closed position, which is a lower stroke end position, and bringing an inverted conical-shaped abutment surface 12 provided on a lower surface of the large diameter portion 11c into abutment against an inverted conical-shaped opening and closing port defining surface 13 provided on an upper surface of the nozzle end member 7, the flow path 8 can be shut off at the opening and closing port 8a, that is, the opening and closing port 8a can be closed. On the other hand, by moving the seal body 11 upward to the open position from the closed position so that the abutment surface 12 is positioned upward away from the opening and closing port defining surface 13, the flow path 8 can be released at the opening and closing port 8a, that is, the opening and closing port 8a can be opened. Additionally, the shape of the abutment surface 12 and the shape of the opening and closing port defining surface 13 (opening and closing port 8a) may be changed as appropriate. Further, the opening and closing port 8a may be defined by the inner peripheral surface of the nozzle end member 7, and the opening and closing port 8a may be configured to be opened and closed by abutment and separation between an outer peripheral surface of the extension portion 11d and the inner peripheral surface of the nozzle end member 7.

Part of the large-diameter portion 11c and the extension portion 11d are configured by a seal body end member 14. Additionally, the seal body end member 14 may be formed of, for example, a steel material, a resin material, or the like. The remaining part of the large-diameter portion 11c and the shaft body 11b are configured by a seal body base portion 15 formed by a plurality of members. An illustration and description of the detail of the seal body base portion 15 will be omitted. The seal body end member 14 includes a thread portion 14a which is screwed to the seal body base portion 15. Additionally, the seal body base portion 15 may be configured by a single member. Further, the seal body 11 may be configured by a single member.

By opening the opening and closing port 8a by the seal body 11 in a state in which nozzle tip 7a is inserted into the mouth 2a of the preform 2 placed into the mold 3 and in which the pressurized fluid supply unit 10 is operated, a pressurized liquid can be supplied into the preform 2 from the pressurized liquid supply unit 10 through the discharge port 8b, so that the preform 2 can be blow-molded. Further, supply of the liquid to the molded container C can be stopped by closing the opening and closing port 8a by the seal body 11 after blow molding.

In the guide hole 11a of the seal body 11, there is provided a rod 16 which moves in the axial direction while being guided by the guide hole 11a. That is, the rod 16 is configured to slide along the central axis O relative to the seal body 11 in the guide hole 11a. At the time of blow molding, it is possible to stretch the preform 2 that has been placed into the mold 3 in the axial direction (longitudinal direction) by the rod 16 in the cavity 4, by moving the rod 16 downward relative to the seal body 11. That is, the liquid blow molding apparatus 1 can biaxially stretch blow mold the preform 2, using the rod 16 as a stretching rod. The rod 16 has a solid cylindrical shape.

The cylindrical-shaped inner peripheral surface of the nozzle end member 7 corresponds to a discharge port defining surface 17 that defines the discharge port 8b. The discharge port defining surface 17 is provided, in a portion thereof located above the nozzle tip 7a, with an annular-shaped peripheral groove 17a that extends in the circumferential direction. The extension portion 11d of the seal body 11 is configured so that when the seal body 11 is in the closed position, the outer peripheral surface of the extension portion 11d faces the discharge port defining surface 17. Further, the extension portion 11d is configured so that when the seal body 11 is in the closed position, a lower end surface of the extension portion 11d is positioned flush with the lower end surface of the nozzle tip 7a. The extension portion 11d has the outer peripheral surface that faces the inner peripheral surface of the nozzle end member 7 with a small gap therebetween provided to reduce sliding resistance with respect to the inner peripheral surface of the nozzle end member 7. This outer peripheral surface is provided with an annular-shaped peripheral groove 18 that extends in the circumferential direction. The peripheral groove 18 is configured to face the peripheral groove 17a when the seal body 11 is in the closed position.

The seal body end member 14 has an inner peripheral surface that may be in sliding contact with an outer peripheral surface of the rod 16. Additionally, a small gap may be provided between the inner peripheral surface of the seal body end member 14 and the outer peripheral surface of the rod 16 so as to reduce sliding resistance therebetween.

The liquid blow molding apparatus 1 includes a liquid drawing mechanism. The drawing mechanism includes a plurality of drawing holes 19 provided in the extension portion 11d, a drawing path 20 provided in the nozzle end member 7, and a liquid drawing unit 22 connected to the drawing path 20 via an opening and closing valve 21.

Figure 4:
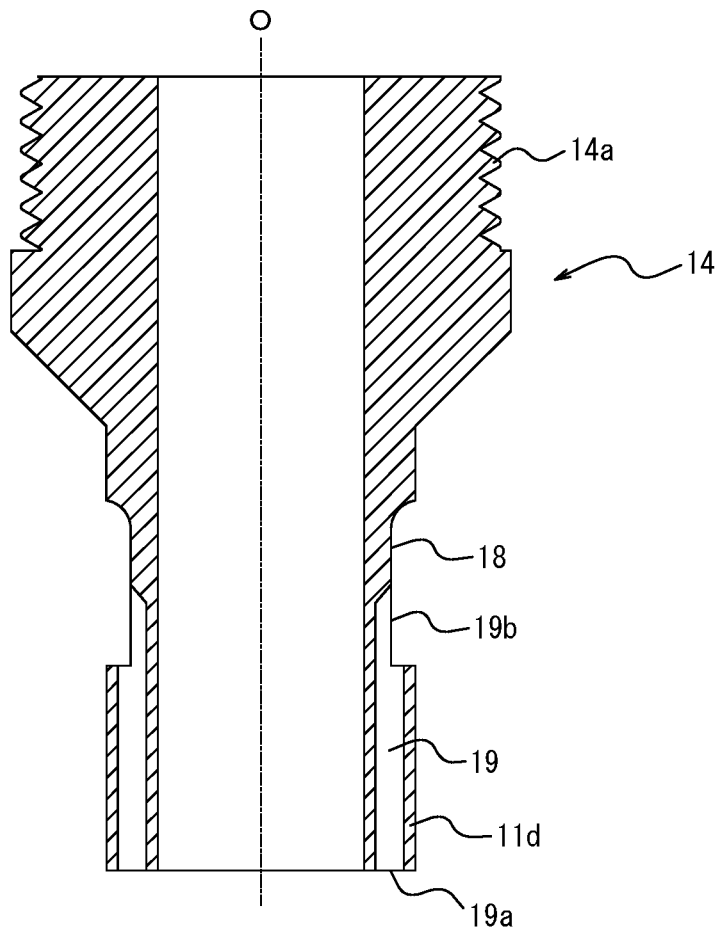
FIG. 4 is a longitudinal sectional view illustrating a seal body tip member in the liquid blow molding apparatus of FIG. 1.
Figure 5:
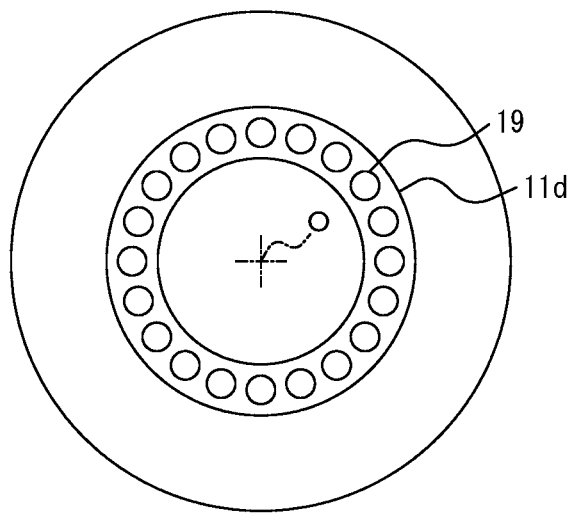
FIG. 5 is a bottom view illustrating the seal body tip member of FIG. 4.

As illustrated in FIG. 5, twenty drawing holes 19 are provided at an equal interval in the circumferential direction. The number of drawing holes 19, however, may be changed as appropriate, and it is possible to provide only a single drawing hole 19. Further, the plurality of drawing holes 19 does not need to be provided at an equal interval in the circumferential direction. As illustrated in FIG. 4, each drawing hole 19 extends from a first end 19a which opens at the lower end surface of the extension portion 11d to a second end 19b which opens at the outer peripheral surface of the extension portion 11d. Further, each drawing hole 19 extends linearly in the up and down direction. Each drawing hole 19 may, however, extend linearly while being inclined with respect to the up and down direction, for example. Although each drawing hole 19 has a circular transverse sectional shape, the transverse sectional shape may be changed as appropriate without being limited to this example. The second end 19b of each drawing hole 19 is open to the annular-shaped peripheral groove 18 provided on the outer peripheral surface of the extension portion 11d.

As illustrated in FIG. 1, the drawing path 20 of the nozzle end member 7 includes the peripheral groove 17a, and a horizontal hole 23 extending to the outer side in the radial direction from the peripheral groove 17a. The drawing path 20 is configured to communicate with the second end 19b of each of the plurality of drawing holes 19 when the seal body 11 is in the closed position. The liquid drawing unit 22 is connected to the horizontal hole 23 via the opening and closing valve 21. Thus, the drawing path 20 is configured to connect the plurality of drawing holes 19 and the liquid drawing unit 22 via the peripheral groove 18 when the seal body 11 closes the opening and closing port 8a. The opening and closing valve 21 is preferably provided inside the nozzle unit 5, but may be provided outside the nozzle unit 5. Further, the opening and closing valve 21 is configured by a motor-driven control valve and may be controlled to open and close by a control means which is not illustrated. The opening and closing valve 21 may, however, be configured by, for example, a pneumatic or hydraulic control valve or the like.

The liquid drawing unit 22 is configured by, for example, a vacuum pump, which can to draw a liquid from the drawing path 20 when the opening and closing valve 21 is opened. Thus, when the seal body 11 is in the closed position and when the lower end surface of the rod 16 is positioned substantially flush with those of the nozzle tip 7a and the extension portion 11d, the liquid drawing unit 22 can draw a liquid that has adhered to these lower end surfaces via the plurality of drawing holes 19 and the drawing path 20, thus preventing the liquid from dripping down.

In the present embodiment, the nozzle body 6 and the nozzle end member 7 constitute a nozzle 5a, which defines a flow path 8 that includes the opening and closing port 8a and the discharge port 8b. Further, in the present embodiment, the seal body 11 and the rod 16 constitute a nozzle core 5b, which opens and closes the opening and closing port 8a. Moreover, the nozzle 5a and the nozzle core 5b constitute the nozzle unit 5.

In the nozzle unit 5, when the seal body 11 is in the closed position, a liquid sometimes adheres to a liquid passage downstream of the opening and closing port 8a. If the liquid adheres and accumulates after blow molding, the liquid drips down from there, thus possibly adhering to the molded container C or the mold 3 from which the molded container C has been removed. In view of this, the nozzle unit 5 according to the present embodiment is configured to have liquid repellency in an area thereof where the liquid is likely to adhere and accumulate, so as to allow the adhered liquid to fall rapidly and thus prevent the liquid from accumulating after blow molding.

In the present embodiment, in order to prevent the dripping down of the liquid from the nozzle 5a after blow molding, the lower end surface of the extension portion 11d of the seal body 11, the lower end surface and the outer peripheral surface of the rod 16 (corresponding to a portion that protrudes below the lower end surface of the extension portion 11d), and at least one of the outer peripheral surface of the extension portion 11d and the discharge port defining surface 17 are configured to have liquid repellency.

Since the lower end surface of the extension portion 11d of the seal body 11 has liquid repellency, a liquid is allowed to rapidly fall from the lower end surface of the extension portion 11d, that is, an area where the liquid is most likely to accumulate due to its contact with the liquid, the movement of the liquid from the rod 16 which is raised while passing through the guide hole 11a, and the movement of the liquid from the discharge port defining surface 17 in response to the seal body 11 being lowered. Thus, the dripping down of the liquid is efficiently prevented. Further, since the lower end surface and the outer peripheral surface of the rod 16 have liquid repellency, it is possible to reduce the amount of liquid that adheres to the outer surface of the rod 16 after blow molding. Moreover, since at least one of the outer peripheral surface of the extension portion 11d and the discharge port defining surface 17 (e.g., a portion below the peripheral groove 17a and the peripheral groove 18) has liquid repellency, it is possible to reduce the amount of liquid that leaks and drips down from the gap between the outer peripheral surface of the extension portion 11d and the discharge port defining surface 17 after blow molding.

It is to be noted that "to have liquid repellency" in the present application means to have liquid repellency (water repellency) at which a contact angle with pure water of not less than 110° is observed and at which pure water (10 μL) exhibits a rolling angle of not more than 30°. Here, the contact angle means a contact angle of a drop of pure water, when it is placed on a plate formed of the same material as the area that has liquid repellency. The contact angle may be measured using a contact angle measurement apparatus (e.g., contact angle meter: CA-D, manufactured by Kyowa Interface Science Co., Ltd.). Further, the rolling angle means an angle at which a drop of pure water starts to roll off, when it is placed on a plate formed of the same material as the area that has liquid repellency and the plate is tilted.

Liquid repellency can be imparted by any appropriate known means. Liquid repellency may be obtained by the material or structure of the surface of a base material itself, or may be obtained by the material or structure of a coating layer that coats the surface of a base material. Materials that may be used include a silica-based material, a fluorine-based material, a silicone-based material, or the like. Structures that may be used include a fine uneven structure, a fractal structure, a reentrant structure, or the like. Examples of means for providing a coating layer may include, but are not particularly limited to, evaporation, coating, or the like.

Next, an example of a procedure for blow molding the preform 2 using the above liquid blow molding apparatus 1 will be described.

Firstly, as illustrated in FIG. 1, the preform 2 is placed into the mold 3, in a state in which the seal body 11 is in the closed position so as to close the opening and closing port 8a. Subsequently, the nozzle unit 5 is lowered, so that the nozzle tip 7a is inserted into the mouth 2a of the preform 2. At this time, the rod 16 is in its origin position where its lower end surface is positioned flush with the lower end surface of the extension portion 11d of the seal body 11.

Secondly, the seal body 11 is moved to the open position, so as to open the opening and closing port 8a. When the opening and closing port 8a is opened, a pressurized liquid is supplied into the preform 2 from the pressurized liquid supply unit 10 via the flow path 8, so that the preform 2 is blow molded (liquid blow molded) by the liquid. Further, at the time of blow molding, the rod 16 is lowered, and therefore, the preform 2 is stretched in the axial direction (longitudinal direction) by the rod 16. The preform 2 is subjected to such biaxially stretch blow molding and molded into the container C having a bottle shape corresponding to the cavity 4 of the mold 3.

Figure 3:
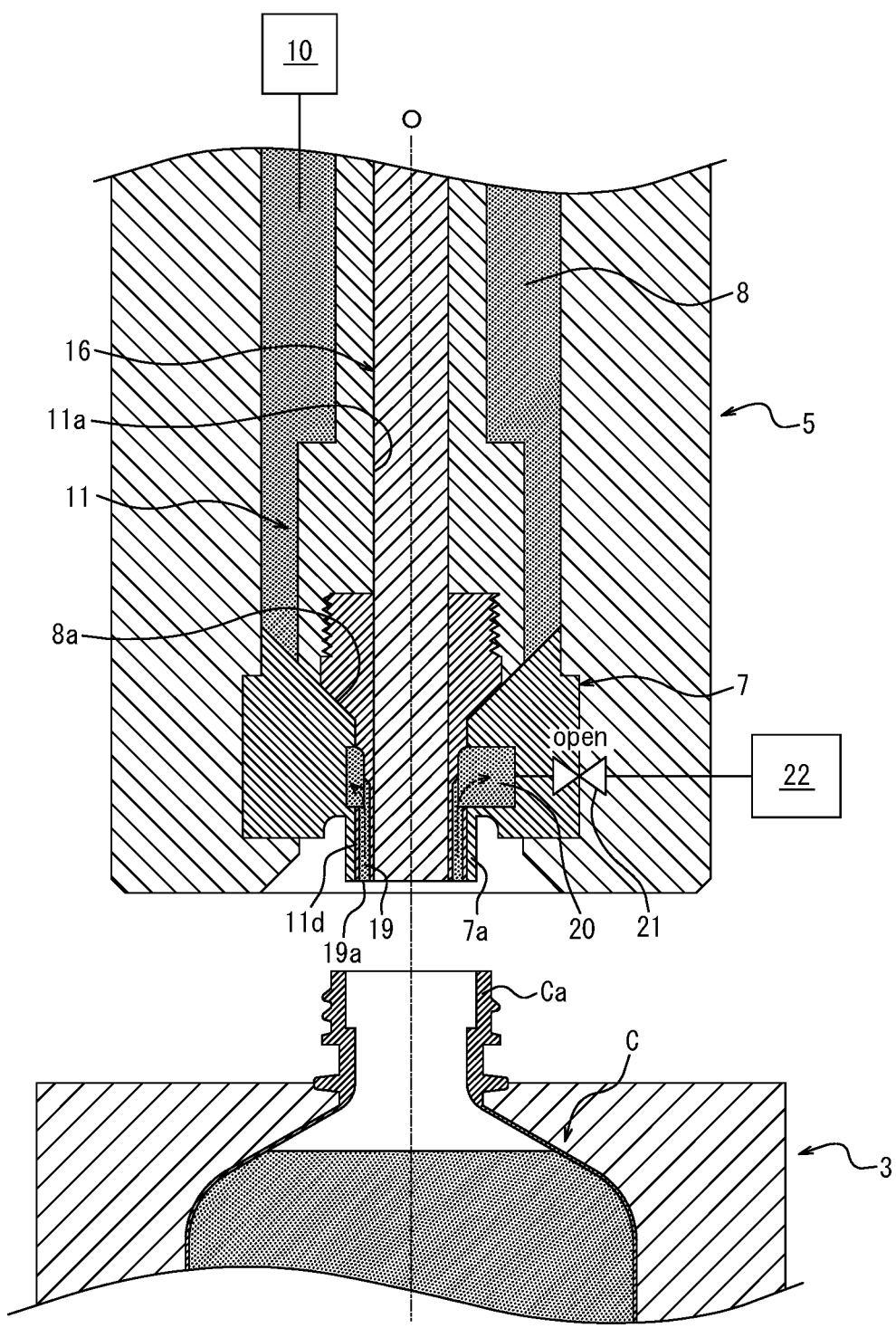
FIG. 3 is a longitudinal sectional view illustrating the liquid blow molding apparatus of FIG. 1 in a state in which a nozzle unit has been separated from a blow molded container.

When blow molding is completed, the seal body 11 is lowered to the closed position, the opening and closing port 8a is closed so as to stop the supply of the liquid, and the rod 16 is raised to a position (i.e., its original position) where its lower end surface is positioned flush with the lower end surface of the extension portion 11d of the seal body 11. Then, as illustrated in FIG. 3, the nozzle unit 5 is raised, and the nozzle tip 7a is separated upward from a mouth Ca of the container C. At this time, the rod 16 is raised and taken out of the liquid in the container C, and a headspace having a volume equal to that of the taken rod is formed within the container C. The headspace may, however, be formed in a different manner. Additionally, the rod 16 may be used not as a biaxially stretching rod but as a headspace forming rod.

Further, when the nozzle unit 5 is raised and the nozzle tip 7a is separated upward from the mouth Ca of the container C, the dripping down of the liquid from the nozzle 5a is prevented. This is because the lower end surface of the extension portion 11d of the seal body 11, the lower end surface and the outer peripheral surface of the rod 16, and at least one of the outer peripheral surface of the extension portion 11d and the discharge port defining surface 17 have liquid repellency. In particular, according to the present liquid blow molding apparatus 1, blow molding can be efficiently performed by preventing the dripping down of the liquid and by preventing an increase in cycle time, even in a case in which a relatively highly viscous liquid, such as shampoo or liquid detergent, is used as the liquid.

Furthermore, after blow molding is completed, the opening and closing valve 21 is opened, the liquid drawing unit 22 starts to operate, and the liquid that has adhered to the lower end surfaces of the nozzle tip 7a, the extension portion 11d, and the rod 16 is drawn through the plurality of drawing holes 19 and the drawing path 20, as illustrated by a broken line arrow in FIG. 3. At this time, even if the liquid that has adhered to the outer peripheral surface of the rod 16 is moved to the lower end surface of the rod 16 in response to the rod 16 being raised while passing through the guide hole 11a of the seal body 11, the liquid can be efficiently drawn through the first end 19a of each of the plurality of drawing holes 19 provided on the lower end surface of the extension portion 11d arranged adjacent to the lower end surface of the rod 16. Thus, the dripping down of the liquid can be prevented even more reliably.

Needless to say, the present disclosure is not limited to the above embodiment, and various changes may be made without departing the gist of the present disclosure.

For example, although in the above embodiment the nozzle tip 7a and the extension portion 11d each have a cylindrical shape, the present disclosure is not limited to this example. For example, the nozzle tip 7a and the extension portion 11d may be shaped like a tube having a polygonal, an elliptical, or another sectional shape. In a case in which the mouth 2a of the preform 2 has a cylindrical shape, however, it is preferable that the outer peripheral surface of the nozzle tip 7a has a cylindrical shape.

Further, although in the above embodiment the rod 16 has a solid cylindrical shape, the present disclosure is not limited to this example. For example, the rod 16 may include therein a flow path that is connected to the pressurized liquid supply unit 10. In this case, the rod 16 may be configured by, for example, a cylindrical-shaped outer tube and a poppet valve-shaped opening and closing rod that can open and close a lower end surface of the outer tube.

Moreover, although in the above embodiment the extension portion 11d is configured so that the lower end surface of the extension portion 11d is positioned flush with the lower end surface of the nozzle tip 7a when the seal body 11 is in the closed position, the present disclosure is not limited to this example. The extension portion 11d may be configured so that the lower end surface of the extension portion 11d is positioned above or below the lower end surface of the nozzle tip 7a when the seal body 11 is in the closed position. Moreover, although in the above embodiment the lower end surface of the extension portion 11d extends horizontally, the present disclosure is not limited to this example. For example, the lower end surface of the extension portion 11d may be inclined upward or downward toward the inner side in the radial direction.

Moreover, although in the above embodiment the lower end surface of the extension portion 11d of the seal body 11, the lower end surface and the outer peripheral surface of the rod 16, and at least one of the outer peripheral surface of the extension portion 11d and the discharge port defining surface 17 have liquid repellency, the present disclosure is not limited to this example. For example, it is possible that only the lower end surface of the extension portion 11d has liquid repellency.

Moreover, the liquid drawing unit 22, the drawing holes 19, the peripheral groove 18, the drawing path 20, and the opening and closing valve 21 may be omitted.

REFERENCE SIGNS LIST

1 Liquid blow molding apparatus
2 Preform
2a Mouth
3 Mold
4 Cavity
5 Nozzle unit
5a Nozzle
5b Nozzle core
6 Nozzle body
7 Nozzle end member
7a Nozzle tip
7b Holding portion
8 Flow path
8a Opening and closing port
8b Discharge port
9 Pipe
10 Pressurized liquid supply unit
11 Seal body
11a Guide hole
11b Shaft body
11c Large-diameter portion
11d Extension portion
12 Abutment surface
13 Opening and closing port defining surface
14 Seal body end member
14a Thread portion
15 Seal body base portion
16 Rod
17 Discharge port defining surface
17a Peripheral groove
18 Peripheral groove
19 Drawing hole
19a First end
19b Second end
20 Drawing path
21 Opening and closing valve
22 Liquid drawing unit
23 Horizontal hole
O Central axis
C Container
Ca Mouth

The invention claimed is:

1. A liquid blow molding apparatus, comprising: a nozzle configured to define a flow path for a liquid that includes an opening and closing port and a discharge port; a seal body configured to open and close the opening and closing port and includes a guide hole; a rod configured to move in an axial direction while being guided by the guide hole; and a liquid drawing unit configured to draw the liquid, wherein
the seal body includes a tubular-shaped extension portion configured to extend into the discharge port when the seal body closes the opening and closing port,
a tip surface of the extension portion is configured to have liquid repellency,
the extension portion of the seal body includes a drawing hole configured to communicate with the tip surface of the extension portion, and
the nozzle includes a drawing path configured to connect the drawing hole and the liquid drawing unit when the seal body closes the opening and closing port.

2. The liquid blow molding apparatus according to claim 1, wherein a tip surface and an outer peripheral surface of the rod are configured to have liquid repellency.

3. The liquid blow molding apparatus according to claim 1, wherein at least one of an outer peripheral surface of the extension portion of the seal body and an inner surface defining the discharge port of the nozzle is configured to have liquid repellency.

4. The liquid blow molding apparatus according to claim 2, wherein at least one of an outer peripheral surface of the extension portion of the seal body and an inner surface defining the discharge port of the nozzle is configured to have liquid repellency.

* * * * *